(12) United States Patent
Fascella et al.

(10) Patent No.: US 12,330,188 B2
(45) Date of Patent: Jun. 17, 2025

(54) SURFACE COVERING AND METHOD FOR THE MANUFACTURE THEREOF

(71) Applicant: TARKETT GDL S.A., Lentzweiler (LU)

(72) Inventors: Guillaume Fascella, Wiltz (LU); Michel Cancellier, Wiltz (LU)

(73) Assignee: TARKETT GDL S.A., Lentzweiler (LU)

( * ) Notice: Subject to any disclaimer, the term of this patent is extended or adjusted under 35 U.S.C. 154(b) by 0 days.

(21) Appl. No.: 17/795,138

(22) PCT Filed: Jan. 29, 2021

(86) PCT No.: PCT/EP2021/052098
§ 371 (c)(1),
(2) Date: Jul. 25, 2022

(87) PCT Pub. No.: WO2021/152084
PCT Pub. Date: Aug. 5, 2021

(65) Prior Publication Data
US 2023/0073511 A1   Mar. 9, 2023

(30) Foreign Application Priority Data

Jan. 31, 2020   (LU) ........................... 101630

(51) Int. Cl.
*B05D 3/06*   (2006.01)
*B05D 3/12*   (2006.01)
(Continued)

(52) U.S. Cl.
CPC ............... *B05D 3/067* (2013.01); *B05D 3/12* (2013.01); *B05D 7/06* (2013.01); *B05D 7/582* (2013.01);
(Continued)

(58) Field of Classification Search
None
See application file for complete search history.

(56) References Cited

U.S. PATENT DOCUMENTS

| | | | | |
|---|---|---|---|---|
| 6,617,413 B1* | 9/2003 | Bruchmann | ....... | C08G 18/7837 427/508 |
| 2008/0026662 A1* | 1/2008 | Ramsey | .................... | C09D 5/04 442/376 |

FOREIGN PATENT DOCUMENTS

| | | |
|---|---|---|
| EP | 2 154 184 | 2/2010 |
| WO | 2006/081346 | 8/2006 |

(Continued)

OTHER PUBLICATIONS

International Search Report for PCT/EP2021/052098 dated May 6, 2021, 4 pages.

(Continued)

*Primary Examiner* — Jeffrey D Washville
(74) *Attorney, Agent, or Firm* — NIXON & VANDERHYE

(57) ABSTRACT

Disclosed is a surface covering including: a wood-based substrate; a surface coating layer, the surface coating layer being obtained by the irradiation of a radiation-curable coating agent with UV light having a wavelength included from 120 nm to 230 nm; and a filler coating layer, the filler coating layer being located between the wood-based substrate and the surface coating layer. Also disclosed is a method for the manufacture of such a surface covering.

13 Claims, 1 Drawing Sheet

(51) Int. Cl.
*B05D 7/00* (2006.01)
*B05D 7/06* (2006.01)
*C09D 4/00* (2006.01)

(52) U.S. Cl.
CPC ............ *C09D 4/00* (2013.01); *B05D 2203/20* (2013.01); *B05D 2425/01* (2013.01); *B05D 2430/00* (2013.01)

(56) References Cited

FOREIGN PATENT DOCUMENTS

| WO | 2015/006704 | 1/2015 | |
|---|---|---|---|
| WO | 2016/030538 | 3/2016 | |
| WO | WO-2016030538 A1 * | 3/2016 | ............... B05D 1/38 |
| WO | 2020/009592 | 1/2020 | |

OTHER PUBLICATIONS

Written Opinion of the ISA for PCT/EP2021/052098 dated May 6, 2021, 6 pages.
Rompp Lexikon Lacke and Druckfarben, Georg Thieme Verlag, Stuttgart, N.Y., 1998 "Reaktivverdunner", pp. 491 and 492 (Submission Pending).
"Lackadditive" by Johan Bieleman, Wiley-VCH, Weinheim, N.Y., 1998 (Submission Pending).
D. Stoye and W. Freitag (Editors), "Paints, Coatings and Solvents", Second, Completely Revised Edition, Wiley-VCH, Weinheim, N.Y., 1998 "14.9. Solvent Groups", pp. 327 to 373 (Submission Pending).
Lockert, Pigmente and FOllstofftabellen, Poppdruck, Langenhagen, 1994 (Submission Pending).
R. Stephen Davidson, "Exploring the Science, Technology and Applications of U.V. and E.B. Curing", Sita Technology Ltd., London, 1999, Chapter I, "An Overview", p. 16, Figure 10, or Dipl.-lng. Peter Klamann, "eltosch System-Kompetenz, UV-Technik, Leitfaden tor Anwender", p. 2, Oct. 1998 (Submission Pending).

* cited by examiner

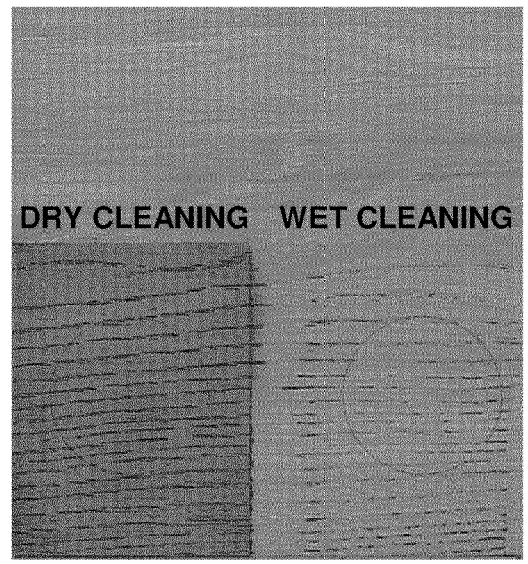
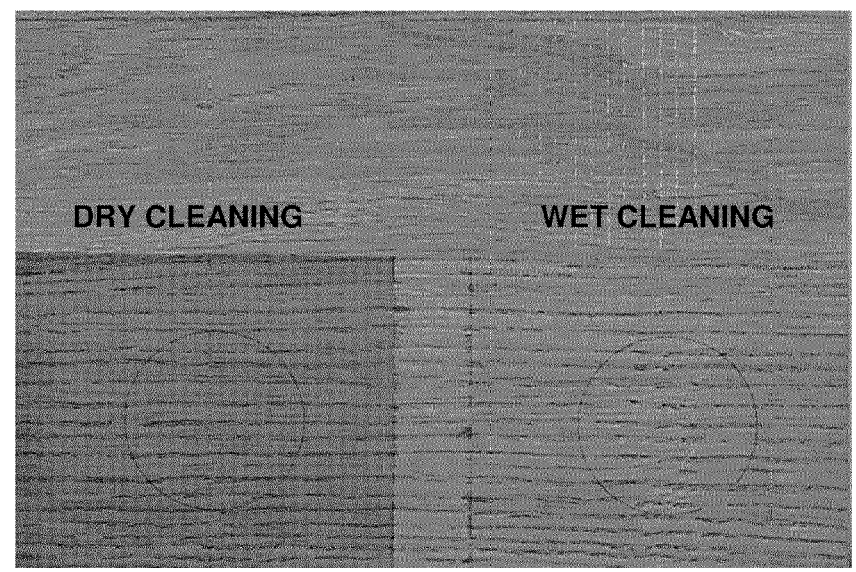

SURFACE COVERING AND METHOD FOR THE MANUFACTURE THEREOF

CROSS-REFERENCE TO RELATED APPLICATIONS

This application is the U.S. national phase of International Application No. PCT/EP2021/052098 filed Jan. 29, 2021 which designated the U.S. and claims priority to LU Patent Application No. LU101630 filed Jan. 31, 2020, the entire contents of each of which are hereby incorporated by reference.

BACKGROUND OF THE INVENTION

Field of the Invention

The present invention concerns a surface covering, in particular floor or wall covering, comprising at least one wood-based substrate, a surface coating layer and a filler coating layer between said substrate and surface coating layer, as well as a method for the manufacture of said surface covering.

Description of the Related Art

Surface coverings, in particular floor or wall coverings, are widely used in residential and commercial sectors. Consequently, said surface coverings have to meet high requirements regarding aesthetic and technical properties such as wear resistance or cleaning ability.

As described in the prior art, a way to improve these properties, is by using a coating layer at the top of said surface coverings. Usual coating layers are for instance UV lacquers, water-based dispersions, solvent based dispersions, 100% solids urethanes, polyesters, epoxy and so one.

However, known surface coverings with a wood-based substrate do not manage to offer good aesthetic and technical properties such as wear resistance or cleaning ability, at the same time.

Indeed, the known surface coverings with a wood-based substrate are either good to keep the natural aspect of wood thanks to a surface coating layer with low gloss value but poor wear resistance and cleaning ability, or either good in wear resistance and cleaning ability but with a too glossy surface coating layer.

To date, it is an issue in the art to provide a surface covering with a wood-based substrate combining suitable gloss properties together with suitable wear resistance and cleaning properties.

The excimer technology is a well-known technology such as described in the patent application EP 2 154 184. This technology is well known for thermoplastic resilient substrates but the methods from the prior art are not adapted to wood-based substrates as wood-based substrates are too porous compared to thermoplastic resilient substrates.

SUMMARY OF THE INVENTION

The aim of the present invention is thus to provide a surface covering with a wood-based substrate, having suitable gloss properties, especially having low gloss, while also having improved cleaning and wear resistance properties.

The aim of the present invention is also to provide a surface covering with a wood-based substrate, with low gloss in order to keep the natural aspect of wood but without being implying a compulsory decrease of the coating thickness.

Therefore, the present invention relates to a surface covering comprising:
- a wood-based substrate,
- a surface coating layer, said surface coating layer being obtained by the irradiation of a radiation-curable coating agent with UV light having a wavelength comprised from 120 nm to 230 nm, preferably from 150 nm to 225 nm, particularly 172 nm, said irradiation being optionally followed by the curing of said coating by means of actinic radiation, and
- a filler coating layer, said filler coating layer being located between the wood-based substrate and the surface coating layer.

According to an embodiment, the irradiation of the radiation-curable coating agent as mentioned above is followed by the curing of said coating by means of actinic radiation, such as UV light or electron beam.

Preferably, said curing is carried out by irradiation with UV light having a wavelength comprised from 200 nm to 420 nm, preferably from 280 nm to 420 nm.

Filler Coating Layer

As mentioned above, the surface covering of the invention comprises at least one filler coating layer.

According to an embodiment, the thickness of the filler coating layer is comprised from 5 μm to 40 μm, preferably from 15 μm to 30 μm, and more preferably from 20 μm to 25 μm.

According to a preferred embodiment, the filler coating layer of the surface covering of the invention is obtained by actinic radiation, such as UV light or electron beam.

Preferably, the filler coating layer comprises a filler. According to an embodiment, the filler derives from the oligomers and/or polymers selected from the group consisting of: (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates, and phosphazene (meth)acrylates.

According to an embodiment, the filler coating layer is obtained by actinic radiation, such as UV light or electron beam, of oligomers and/or polymers selected from the group consisting of: (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates, and phosphazene (meth)acrylates.

More preferably, the filler comprises an acrylate functionalized resin.

The filler coating layer is for example a filler coating which has been cured using UV rays. The filler is for example a thixotropic UV curable coating based on acrylate functionalized resin, such as urethane, polyester, or epoxy. The filler is used to fill the pores of the wood substrate and smoothen the surface.

According to an advantageous embodiment, the filler is an acrylate based coating. Preferably, the filler comprises an aromatic urethane acrylate, and optionally a photoinitiator. It may also comprise a difunctional acrylic monomer, such as dipropylene glycol diacrylate.

The presence of a filler coating layer implies that any modification/defect in this layer would affect the surface properties of the corresponding surface covering, and in particular would affect the gloss properties.

Surface Coating Layer

As mentioned above, the surface covering of the invention comprises a surface coating layer obtained by the irradiation of a radiation-curable coating agent.

According to an embodiment, the radiation-curable coating agent as mentioned above contains at least one radiation-curable binder and at least one photoinitiator.

Said radiation-curable binder derives from the oligomers and/or polymers containing at least one, in particular at least two double bonds that can be activated by actinic radiation are suitable as the binder. These polymers and/or oligomers conventionally have a number-average molecular weight from 250 to 50,000 g/mol, preferably from 500 to 25,000 g/mol, in particular from 700 to 5,000 g/mol. They preferably have a double bond equivalent weight from 100 to 4,000 g/mol, particularly preferably from 300 to 2,000 g/mol. They are preferably used in an amount from 5 to 99 wt. %, preferably 10 to 90 wt. %, particularly preferably 20 to 80 wt. %, relative in each case to the solids content of the coating agents according to the invention. The number-average molecular weight of the binders is determined by means of gel permeation chromatography with polystyrene as the standard and tetrahydrofuran as the mobile phase.

Within the context of this invention "(meth)acrylate" relates to corresponding acrylate or methacrylate functions or to a mixture of the two.

Examples of suitable radiation-curable binders derive from the oligomer and/or polymer classes of (meth)acrylic-functional (meth)acrylic copolymers, polyether (meth)acrylates, polyester (meth)acrylates, epoxy (meth)acrylates, urethane (meth)acrylates, amino (meth)acrylates, melamine (meth)acrylates, silicone (meth)acrylates and phosphazene (meth)acrylates. Binders are preferably used that are free from aromatic structural units. Urethane (meth)acrylates, phosphazene (meth)acrylates and/or polyester (meth)acrylates are preferably used, particularly preferably urethane (meth)acrylates, most particularly preferably aliphatic urethane (meth)acrylates.

According to an embodiment, the radiation-curable binder is selected from the group consisting of: urethane (meth)acrylates, phosphazene (meth)acrylates, and polyester (meth)acrylates, and is preferably selected from the group consisting of: urethane (meth)acrylates, most particularly preferably aliphatic urethane (meth)acrylates.

According to an embodiment, the surface coating layer is an optionally cured polymeric and/or oligomeric layer made of cured oligomers and/or polymers, said oligomers and polymers being selected from the group consisting of: (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates, and phosphazene (meth)acrylates.

According to an embodiment, the radiation-curable coating agent further contains at least one further ingredient, selected from the group consisting of: reactive thinners to reduce the viscosity, additives, light stabilisers, stabilisers, pigments, fillers, solvents, matting agents, and mixtures thereof.

To reduce the viscosity, low-molecular-weight monomers containing double bonds, known as reactive thinners, can be added to the binders described above.

Compounds that likewise (co)polymerise under radiation curing and are thus incorporated into the polymer network can also be used as reactive thinners. Suitable reactive thinners containing at least one, in particular at least two compounds that can be activated by actinic radiation are olefinically unsaturated monomers, preferably vinyl-aliphatic monomers, and acrylates, in particular acrylates, having at least one radically polymerisable double bond and preferably having at least two radically polymerisable double bonds. Suitable reactive thinners are described in detail in Rompp Lexikon Lacke and Druckfarben, Georg Thieme Verlag, Stuttgart, N.Y., 1998 "Reaktivverdunner", pages 491 and 492.

Esters of acrylic acid or methacrylic acid, preferably of acrylic acid, with monofunctional or polyfunctional alcohols are mentioned as reactive thinners by way of example. Suitable alcohols are for example the isomeric butanols, pentanols, hexanols, heptanols, octanols, nonanols and decanols, also cycloaliphatic alcohols such as isobornol, cyclohexanol and alkylated cyclohexanols, dicyclopentanol, aryl aliphatic alcohols such as phenoxyethanol and nonylphenyl ethanol, and tetrahydrofurfuryl alcohols. Alkoxylated derivatives of these alcohols can also be used. Suitable dihydric alcohols are for example alcohols such as ethylene glycol, 1,2-propanediol, 1,3-propanediol, diethylene glycol, dipropylene glycol, the isomeric butanediols, neopentyl glycol, 1,6-hexanediol, 2-ethyl hexanediol and tripropylene glycol, and also alkoxylated derivatives of these alcohols. Preferred dihydric alcohols are 1,6-hexanediol, dipropylene glycol and tripropylene glycol. Suitable trihydric alcohols are glycerol or trimethylolpropane or alkoxylated derivatives thereof. Tetrahydric alcohols are pentaerythritol or alkoxylated derivatives thereof. A suitable hexahydric alcohol is dipentaerythritol or alkoxylated derivatives thereof. The alkoxylated derivatives of the cited trihydric to hexahydric alcohols are particularly preferred.

The coating agents according to the invention contain one or more photoinitiators c). The photoinitiator is activated by high-energy electromagnetic radiation, such as for example visible light or in particular UV radiation, e.g. light of wavelength 200 to 700 nm and thus initiates polymerisation by means of the groups that can be activated by actinic radiation that are contained in the coating agents according to the invention.

The photoinitiator is preferably selected from the group consisting of unimolecular (type I) and bimolecular (type II) photoinitiators. Suitable type II photoinitiators are aromatic ketone compounds such as for example benzophenones in combination with tertiary amines, alkyl benzophenones, 4,4'-bis(dimethylamino)benzophenone (Michler's ketone), anthrone and halogenated benzophenones or mixtures of the cited types. Suitable type I photoinitiators are for example benzoins, benzoin derivatives, in particular benzoin ether, benzil ketals, acylphosphine oxides, in particular 2,4,6-trimethylbenzoyl diphenylphosphine oxides, bisacylphosphine oxides, phenylglycolic acid esters, camphorquinone, α-aminoalkyl phenones, α,α-dialkoxyacetophenones and α-hydroxyalkylphenones.

The coating agents can contain additives. Suitable additives are for example light stabilisers, such as UV absorbers and reversible free-radical scavengers (HALS), antioxidants, degassing agents, wetting agents, emulsifiers, slip additives, polymerisation inhibitors, adhesion promoters, flow control agents, film-forming agents, rheological aids, such as thickeners and pseudoplastic sag control agents (SCAs), flame retardants, corrosion inhibitors, waxes, driers and biocides.

These and further suitable constituents are described in the textbook "Lackadditive" by Johan Bieleman, Wiley-VCH, Weinheim, N.Y., 1998, in D. Stoye and W. Freitag (Editors), "Paints, Coatings and Solvents", Second, Completely Revised Edition, Wiley-VCH, Weinheim, N.Y., 1998, "14.9. Solvent Groups", pages 327 to 373.

The coating agents can also be pigmented. They preferably then contain at least one pigment selected from the group consisting of organic and inorganic, transparent and opaque, colour-imparting and/or special effect-imparting and electrically conductive pigments. Suitable pigments and fillers are described for example in Lückert, Pigmente and Füllstofftabellen, Poppdruck, Langenhagen, 1994.

Solvents can optionally be added to the coating agents. Suitable solvents are inert in respect of the functional groups present in the coating agent, from the time at which they are added to the end of the process. Solvents used in coating technology for example are suitable, such as hydrocarbons, alcohols, ketones and esters, for example toluene, xylene, isooctane, acetone, butanone, methyl isobutyl ketone, ethyl acetate, butyl acetate, tetrahydrofuran, N-methyl pyrrolidone, dimethyl acetamide, dimethyl formamide.

The coating agents can also contain matting agents. Suitable matting agents are for example silicon dioxide, which is adjusted to the necessary particle size for the corresponding coating. Alternatively, urea-methanal condensates or mixtures based on polyamide 12 can also be used.

Wood-Based Substrate

The wood-based substrate has at least an upper layer made of wood or derived from wood.

The upper layer thickness is preferably comprised between 0.5 mm and 4 mm.

Preferably, the wood-based substrate comprises a bottom layer, a core layer and an upper layer applied on the core layer, said upper layer being made of wood or derived from wood.

The core layer can be made of wood, or derived from wood, or with one or more thermoplastic polymers as well or a combination thereof.

According to an embodiment, the core layer comprises one or more polymers selected from the group of thermoplastic materials consisting of (meth)acrylate comprising (co)polymers, vinyl alkanoate comprising (co)polymers, vinylacetals (co)polymers, (co)polyesters, (co)polyamides, polyurethanes, nitrile (co)polymers, styrene (co)polymers, vinylchloride (co)polymers, olefin (co)polymers, ionomers, vinyl chloride (co)polymers, and cellulose ester(s).

In one preferred embodiment, the core layer comprises a material selected from the group consisting of HDF, MDF, cardboards, WPC (Wood Plastic Composite) and soft wood ribs. More preferably, the core layer is made of HDF.

The total thickness of the wood-based substrate is preferably comprised from 7.5 mm to 24 mm.

The wood-based substrate can be for instance a wear layer of hard wood, a core layer made of pine or spruce with transverse fibers or HDF, a bottom layer of spruce veneer.

The substrate has an upper surface which has advantageously been sanded, in order to promote the adherence between the substrate and the coating.

Other Coating Layers

The surface covering of the invention may also comprise other coating layers.

According to an embodiment, the surface covering of the invention further comprises a primer coating layer, said primer coating layer being located between the wood-based substrate and the filler coating layer.

Preferably, the primer coating layer is optionally obtained by actinic radiation, such as UV light or electron beam.

Preferably, the primer coating layer comprises a primer. According to an embodiment, the primer derives from the oligomers and/or polymers selected from the group consisting of: (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates, and phosphazene (meth)acrylates.

According to an embodiment, the primer coating layer is obtained by optional actinic radiation, such as UV light or electron beam, of oligomers and/or polymers selected from the group consisting of: (meth)acrylate copolymers, polyether (meth)acrylates, polyester (meth)acrylates, epoxy (meth)acrylates, urethane (meth)acrylates, amino (meth) acrylates, melamine (meth)acrylates, silicone (meth)acrylates, and phosphazene (meth)acrylates.

The primer is used to increase the adhesion between the wood based substrate and the filler coating layer.

According to an advantageous embodiment, the primer is an acrylate based coating. Preferably, the primer comprises an aliphatic urethane acrylate, and optionally a photoinitiator. It may also comprise a difunctional acrylic monomer, such as dipropylene glycol diacrylate.

According to an embodiment, the surface covering of the invention further comprises at least one sealer layer, said sealer layer being located between the filler coating layer and the surface coating layer.

According to a preferred embodiment, the surface covering of the invention further comprises 3 sealer layers, said sealer layers being located between the filler coating layer and the surface coating layer.

Preferably, the sealer coating layer(s) is (are) optionally obtained by actinic radiation, such as UV light or electron beam.

According to an embodiment, the sealer coating layer(s) is (are) optionally obtained by actinic radiation, such as UV light or electron beam, of oligomers and/or polymers selected from the group consisting of: (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates, and phosphazene (meth)acrylates.

The sealer is used to increase mechanical properties such as wear resistance or scratch resistance of the surface coverings.

According to an advantageous embodiment, the sealer is an acrylate based coating. Preferably, the sealer comprises an aliphatic urethane acrylate, and optionally a photoinitiator. It may also comprise a difunctional acrylic monomer, such as dipropylene glycol diacrylate.

The present invention also relates to a method for the manufacture of a surface covering as defined above, comprising the following steps:
    obtaining a wood-based substrate having at least an upper layer made of wood or derived from wood
    optionally sanding an upper surface defined by the upper layer;
    coating the wood-based substrate, by applying a filler coating layer on the upper surface and optionally curing the filler layer of coating using actinic radiation,
    optionally sanding an upper surface defined by the filler coating layer;
    applying a radiation-curable coating agent on the filler coating layer for the formation of a radiation-curable coating;
    irradiation of the radiation-curable coating with UV light having a wavelength comprised from 120 nm to 230 nm, preferably from 150 nm to 225 nm, particularly 172 nm, and optionally the curing of said coating by means of actinic radiation.

The wood-based substrate, the filler coating layer and the radiation-curable coating are as defined above.

For the irradiation step, suitable radiation sources are in particular excimer UV lamps, which emit UV light in the range from 120 nm to 230 nm, preferably 150 nm to 225 nm, particularly preferably 172 nm. The micro-folding according to this step must take place in an oxygen-reduced atmosphere or under complete exclusion of oxygen, i.e. in an inert gas atmosphere. The optional curing in this step is particularly preferably performed in an inert gas atmosphere. An inert gas is understood to be a gas that under the applied curing conditions is not destroyed by actinic radiation, does not inhibit curing and does not react with the coating agents applied according to the invention. Nitrogen, carbon dioxide, combustion gases, helium, neon or argon are preferably used, particularly preferably nitrogen.

This nitrogen should contain only very small amounts of foreign gases such as oxygen for example. Degrees of purity of less than 300 ppm oxygen are preferably used.

According to an embodiment, the optional curing step is carried out by irradiation with UV light having a wavelength comprised from 200 nm to 420 nm, preferably from 280 nm to 420 nm.

UV-A-emitting radiation sources (e.g. fluorescent tubes, LED technology or lamps, which are sold for example by Panacol-Elosol GmbH, Steinbach, Germany, under the name UV-H 254, Quick-Start UV 1200, UV-F 450, UV-P 250C, UV-P 280/6 or UV-F 900), high- or medium-pressure mercury vapour lamps, wherein the mercury vapour can be modified by doping with other elements such as gallium or iron, pulsed lamps (known as UV flash lamps) or halogen lamps, for example, are suitable as radiation sources for UV light in the specified wavelength range in the last step (curing). Further suitable UV emitters or lamps are described in R. Stephen Davidson, "Exploring the Science, Technology and Applications of U.V. and E.B. Curing", Sita Technology Ltd., London, 1999, Chapter I, "An Overview", page 16, FIG. 10, or Dipl.-Ing. Peter Klamann, "eltosch System-Kompetenz, UV-Technik, Leitfaden für Anwender", page 2, October 1998. The emitters can be installed in a fixed location, such that the item to be irradiated is moved past the radiation source by means of a mechanical device, or the emitters can be mobile and the item to be irradiated does not change its position during the partial gelation.

High- or medium-pressure mercury vapour lamps are preferably used in the method according to the invention in the curing step, wherein the mercury vapour can be modified by doping with other elements such as gallium or iron.

According to an embodiment, the method of the invention comprises the following steps:

obtaining a wood-based substrate having at least an upper layer made of wood or derived from wood optionally sanding an upper surface defined by the upper layer;

coating the wood-based substrate, by applying a first layer of coating on the upper surface, optionally curing the first layer of coating using actinic radiation (such as UV light or electron beam), said first layer of coating being a primer coating layer;

optionally sanding an upper surface defined by the primer coating layer;

applying a second layer of coating on the first layer of coating, optionally curing the second layer of coating using actinic radiation (such as UV light or electron beam), said second layer of coating being a filler coating layer, optionally sanding an upper surface defined by the filler coating layer;

applying a third layer of coating on the second layer of coating, and optionally curing said third layer of coating using actinic radiation (such as UV light or electron beam), said third layer of coating comprising at least one, preferably three, sealer layer(s);

optionally sanding an upper surface of the third layer of coating;

applying a radiation-curable coating agent on the third layer of coating for the formation of a radiation-curable coating;

the irradiation of the radiation-curable coating with UV light having a wavelength comprised from 120 nm to 230 nm, preferably from 150 nm to 225 nm, particularly 172 nm, and optionally the curing of said coating by means of actinic radiation, preferably by irradiation with UV light having a wavelength comprised from 200 nm to 420 nm, preferably from 280 nm to 420 nm.

Preferably, the irradiation of the radiation-curable coating is performed with exclusion of oxygen, for example in an inert gas atmosphere or oxygen-reduced atmosphere. The irradiation can moreover take place by covering the coating with radiation-transparent media.

The optional curing of the coating can be done by means of actinic radiation, such as for example UV radiation, electron beam radiation, X-ray radiation or gamma radiation. UV radiation in the wavelength range from 200 nm to 420 nm, preferably 280 nm to 420 nm. High- and medium-pressure mercury vapour lamps can be used in particular as UV radiation sources, wherein the mercury vapour can be doped with further elements such as gallium or iron. Furthermore, UV-emitting LEDs and laser-pulsed lamps known as UV flash emitters are suitable. Suitable electron beam emitters are the known emitters of the scanner or curtain type.

For the optional curing under atmospheric conditions, the emitters can be installed in a fixed location, such that the item to be irradiated is moved past the radiation source by means of a mechanical device, or the emitters can be mobile and the item to be irradiated does not change its position during the finish curing.

For optional curing under inert gas conditions, the emitters are preferably installed in a fixed location, such that the item to be irradiated is moved past the radiation source by means of a mechanical device.

The optional curing of the coating preferably takes place under inert gas conditions.

As mentioned above, the wood-based substrate has an upper layer that is advantageously sanded in order to promote the adherence between said substrate and the coating, in particular the first layer of coating corresponding to the primer coating layer.

As mentioned above, the primer coating layer has an upper layer that is advantageously sanded in order to promote the adherence between said primer layer coating and the filler coating layer.

As mentioned above, the filler coating layer has an upper layer that is advantageously sanded in order to promote the adherence between said filler layer coating and the sealer coating layer(s).

According to an embodiment, the surface covering of the invention comprises three sealer layers (i, ii, and iii) and thus the step of applying a third layer of coating on the second layer of coating comprises the following steps:
  applying a sealer layer (i) of coating on the second layer of coating, and optionally curing said sealer layer (i) using actinic radiation (such as UV light or electron beam);
  optionally sanding an upper surface defined by the sealer coating layer (i);
  applying a sealer layer (ii) of coating on the sealer coating layer (i), and optionally curing said sealer layer (ii) using actinic radiation (such as UV light or electron beam);
  optionally sanding an upper surface defined by the sealer coating layer (ii);
  applying a sealer layer (iii) of coating on the sealer coating layer (ii), and optionally curing said sealer layer (iii) using actinic radiation (such as UV light or electron beam).

The sealer coating layer (i) has an upper layer that is advantageously sanded in order to promote the adherence between said layer (i) and the sealer coating layer (ii).

The sealer coating layer (ii) has an upper layer that is advantageously sanded in order to promote the adherence between said layer (ii) and the sealer coating layer (iii).

The sealer coating layer (iii) has an upper layer that is advantageously sanded in order to promote the adherence between said layer (iii) and the surface coating layer.

BRIEF DESCRIPTION OF THE DRAWINGS

FIG. 1A is a picture of Oak Concerto White (Boen) for the soiling/cleaning test;
FIG. 1B is a picture of Oak Professional Proteco Natura (Tarkett) for the soiling/cleaning test; and
FIG. 1C is a picture of the surface according to the invention (Example 1) for the soiling/cleaning test.

DESCRIPTION OF THE PREFERRED EMBODIMENTS

Example 1: Preparation of a Surface Covering According to the Invention

A surface covering according to the invention is prepared according to the following process:
  obtaining a wood-based substrate having an upper layer made of wood or derived from wood;
  applying a first layer of coating on the upper layer with a roller, said first layer of coating being a primer coating layer (UVILUX PRIMER 671-172);
  curing of said layer with a Hg lamp;
  applying a second layer of coating on the first layer of coating with a roller, said second layer of coating being a filler coating layer (UVILUX FILLER 611-107);
  curing of said layer with a Hg lamp;
  applying a third layer of coating on the second layer of coating with a roller, said third layer of coating being a first sealer layer (UVILUX SEALER 661-172)
  curing of said layer with a Hg lamp;
  applying a fourth layer of coating on the third layer of coating with a roller, said fourth layer of coating being a second sealer layer (UVILUX SEALER 661-172)
  curing of said layer with a Hg lamp;
  applying a fifth layer of coating on the fourth layer of coating with a roller, said fifth layer of coating being a third sealer layer (UVILUX SEALER 661-172)
  curing of said layer with a Hg lamp;
  applying a radiation-curable coating agent with a roller on the fifth layer of coating for the formation of a radiation-curable coating (ADLER TOPCOAT EXC);
  irradiation of the radiation-curable coating with UV light having a wavelength of 172 nm; and
  curing of said radiation-curable coating with Hg lamps;

Said wood-based substrate has a composition identical to wood-based substrate from the Oak Professional (Tarkett). The total thickness of the substrate is 13 mm, including an upper layer with a thickness of 2.5 mm.

Said primer coating layer has a thickness of 25 µm.
Said filler coating layer has a thickness of 25 µm.
Said first sealer layer, second sealer layer and third sealer are forming a sealer layer having a thickness of 50 µm
Said radiation-curable coating has a thickness of 10 µm.

Example 2: Gloss Properties

The gloss is measured in Gloss Unit (UG). This measure is based on the amount of reflected light on a surface in comparison with a standard polished glass surface. The amount of reflected light on the surface depends on the angle of incidence.

These measures are carried out for several angles of incidence (60° or) 85° on the basis of the standard NF EN ISO 2813.

At 60°, values below 6 are considered as low gloss, and at 85°, values below 12 are considered as low gloss.

The surface covering of example 1 (invention) is tested for its gloss properties and other prior art surface coverings comprising a wood-based substrate are also tested.

|  | A (comp.) | B (comp.) | Example 1 (invention) |
| --- | --- | --- | --- |
| Gloss 60° | 3.5 | 10 | 5 |
| Gloss 85° | 2.8 | 20 | 9 |

A: Oak Concerto White (Boen)
B: Oak Professional Proteco Natura (Tarkett)

The surface coverings of example 1 (invention) and sample A have a low gloss value. The sample B has not a low gloss value Example 3: Cleaning Properties The surface covering according to the invention as well as prior art wood surface coverings are tested for their cleaning properties by the following soiling and cleaning test:

2 mL of a soiling solution (solution of black carbon) is spread on said surfaces and the surface is left to dry for 2 minutes. Then, the soiled surface is clean with a dry tissue to evaluate cleaning ability with a dry cleaning. The color difference before and after the soiling/cleaning step can be visually evaluated and measured with a colorimeter if needed.

Similar method can be done with a wet tissue to evaluate cleaning ability with a wet cleaning.
A: Oak Concerto White (Boen)
B: Oak Professional Proteco Natura (Tarkett)
As seen in FIG. 1, the surface covering of Example 1 (invention), which has a low gloss value as seen before, exhibits better cleaning properties than samples A and B for wet cleaning and dry cleaning.

Example 4: Wear Resistance

The wear resistance is measured by using EN 1396 standard.

|  | A (comp) | B (comp) | Example 1 (invention) |
|---|---|---|---|
| Number of revolutions | 1550 | 3000 | 3000 |
| Coating thickness (µm) | <50 | 100 | 100 |

A: Oak Concerto White (Boen)
B: Oak Professional Proteco Natura (Tarkett)

The more the number of revolutions is important, the more the wear resistance is good. The wear resistance is better for sample B and the surface covering of Example 1 (invention) because their coating thickness is larger (100 µm) than sample A (<50 µm).

It was possible to have such a big thickness while staying low in gloss and very good in cleaning ability thanks to the invention.

The invention claimed is:

1. A surface covering comprising:
    a wood-based substrate comprising a bottom layer, a core layer and an upper layer applied on the core layer, the upper layer being made of wood or derived from wood,
    a surface coating layer, said surface coating layer being obtained by the irradiation of a radiation-curable coating agent with UV light having a wavelength comprised from 120 nm to 230 nm, followed by the curing of said coating by irradiation with UV light having a wavelength comprised from 280 nm to 420 nm, and
    a filler coating layer, said filler coating layer being located between the wood-based substrate and the surface coating layer,
    wherein said filler coating layer is obtained by actinic radiation of oligomers and/or polymers selected from the group consisting of (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates and phosphazene (meth)acrylates and has a thickness from 5 µm to 40 µm.

2. The surface covering of claim 1, wherein the radiation-curable coating agent contains at least one radiation-curable binder and at least one photoinitiator.

3. The surface covering of claim 2, wherein the radiation-curable binder derives from the oligomers and/or polymers selected from the group consisting of: (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates, and phosphazene (meth)acrylates.

4. The surface covering of claim 1, wherein the radiation-curable coating agent further contains at least one further ingredient, selected from the group consisting of: reactive thinners to reduce the viscosity, additives, light stabilisers, stabilisers, pigments, fillers, solvents, matting agents, and mixtures thereof.

5. The surface covering of claim 1, wherein a primer coating layer is located between the wood-based substrate and the filler coating layer.

6. The surface covering of claim 5, wherein the primer coating layer is obtained by actinic radiation.

7. The surface covering of claim 1, wherein at least one sealer layer is located between the filler coating layer and the surface coating layer.

8. A method for the manufacture of a surface covering of claim 1, comprising the following steps:
    obtaining a wood-based substrate having at least a wood-based upper layer made of wood or derived from wood, the wood-based substrate comprising a bottom layer, a core layer and an upper layer applied on the core layer, the upper layer being made of wood or derived from wood;
    coating the wood-based substrate, by applying a filler coating layer on the upper surface, the filler coating layer comprising a filler deriving from oligomers and/or polymers selected from the group consisting of (meth)acrylate copolymers, polyether (meth)acrylates, polyester (meth)acrylates, epoxy (meth)acrylates, urethane (meth)acrylates, amino (meth)acrylates, melamine (meth)acrylates, silicone (meth)acrylates and phosphazene (meth)acrylates and having a thickness from 5 µm to 40 µm;
    applying a radiation-curable coating agent on the filler coating layer for the formation of a radiation-curable coating; and
    irradiation of the radiation-curable coating with UV light having a wavelength comprised from 120 nm to 230 nm, further comprising curing the radiation-curable coating using actinic radiation with UV light having a wavelength comprised from 280 nm to 420 nm.

9. The method of claim 8, comprising the following steps:
    obtaining a wood-based substrate having at least an upper layer made of wood or derived from wood,
    coating the wood-based substrate, by applying a first layer of coating on the upper surface, said first layer of coating being a primer coating layer,
    applying a second layer of coating on the first layer of coating, said second layer of coating being a filler coating layer,
    applying a third layer of coating on the second layer of coating, said third layer of coating comprising at least one sealer layer;
    applying a radiation-curable coating agent on the third layer of coating for the formation of a radiation-curable coating; and
    irradiating the radiation-curable coating with UV light having a wavelength comprised from 120 nm to 230 nm and subsequently curing the radiation-curable coating using actinic radiation in the form of UV light having a wavelength between 280 nm and 420 nm.

10. The method of claim 8, wherein the irradiation of the radiation-curable coating takes place in an inert gas atmosphere.

11. The method of claim 8, wherein the step of coating the wood-based substrate further comprises curing the filler layer of coating using actinic radiation, and the method comprises the further step of curing the radiation-curable coating using actinic radiation.

12. The method of claim 9, further comprising sanding at least one of:
    the upper surface defined by the upper layer;
    the upper surface defined by the primer coating layer;
    the upper surface defined by the filler coating layer; and
    the upper surface defined by the third layer of coating.

13. The surface covering of claim 3, wherein
the radiation-curable binder is derived from oligomers and/or polymers selected from the group consisting of polyester (meth)acrylates and urethane (meth)acrylates, and
the filler coating layer is obtained by actinic radiation of oligomers and/or polymers selected from the group consisting of polyester (meth)acrylates and urethane (meth)acrylates.

\* \* \* \* \*